United States Patent [19]

Fava et al.

[11] 4,303,783

[45] * Dec. 1, 1981

[54] PRODUCTION OF REFLECTOR BEADS FROM PRECURSOR BEADS FOR EXPANDABLE POLYSTYRENE

[75] Inventors: Ronald A. Fava, Monroeville; Clarence E. Chaney, Verona, both of Pa.

[73] Assignee: ARCO Polymers, Inc., Philadelphia, Pa.

[*] Notice: The portion of the term of this patent subsequent to Dec. 1, 1998, has been disclaimed.

[21] Appl. No.: 146,923

[22] Filed: May 5, 1980

[51] Int. Cl.$^3$ .............................................. C08F 6/24
[52] U.S. Cl. .................................... 528/488; 521/56; 521/60; 526/346; 528/489
[58] Field of Search ............... 521/56, 60; 526/346; 528/488, 489, 490

[56] References Cited

U.S. PATENT DOCUMENTS

| | | | |
|---|---|---|---|
| 2,715,118 | 8/1955 | Grimm | 526/346 |
| 3,207,712 | 9/1965 | Andrews et al. | 526/346 |
| 3,222,343 | 12/1965 | Ingram | 526/346 |
| 3,280,089 | 10/1966 | Wright | 526/346 |
| 3,389,097 | 6/1968 | Ingram et al. | 526/346 |
| 3,425,966 | 2/1969 | Ronder et al. | 526/346 |
| 3,442,881 | 5/1969 | Jahn et al. | 526/346 |
| 3,470,146 | 9/1969 | Mac Lay | 526/346 |
| 3,503,908 | 3/1970 | Wright et al. | 526/346 |
| 3,520,833 | 7/1970 | Wright | 526/346 |
| 3,526,605 | 9/1970 | Ingam | 526/346 |
| 3,647,723 | 3/1972 | Mysik | 526/346 |
| 4,129,706 | 12/1978 | Keppler et al. | 526/346 |

*Primary Examiner*—Morton Foelak
*Attorney, Agent, or Firm*—John R. Ewbank

[57] ABSTRACT

Several established methods produce precursor beads suitable for subsequent impregnation with a volatile agent for making expandable polystyrene beads. Different methods have led to production of reflector beads of crystal clear polystyrene for use as reflectors in movie screens, signs, and the like. Heretofore it has not been practical to use precursor beads as reflector beads. Many reflector beads have been made from plastics more costly than polystyrene. By the present invention, cloudy precursor beads are dispersed in an aqueous solution having a concentration of from about 1.5 to about 6 molar inorganic solute and heated to a temperature in the range from about 110° to 130° C. for a few minutes. The thus treated beads are rinsed with water and then dried to provide reflector beads.

3 Claims, No Drawings

PRODUCTION OF REFLECTOR BEADS FROM PRECURSOR BEADS FOR EXPANDABLE POLYSTYRENE

FIELD OF INVENTION

This invention relates to modifying the optical characteristics of small polystyrene beads so that they are crystal clear instead of cloudy.

PRIOR ART

Heretofore reflector plastic beads have been made from a variety of plastics by a variety of methods. Such approaches for forming crystal clear spheroids useful as reflector beads generally require specialized factories so that occasional production of clear beads has generally not been deemed an appropriate business practice. The demand for clear beads has been expanding by reason of the usefulness of small clear beads as reflectors in signs, movie screens and the like.

Because the demand for expanded polystyrene has been increasing, the production of expandable polystyrene beads has become quite efficient. An intermediate product in such manufacture has been a precursor bead produced by polymerization of a dispersion in an aqueous system of monomeric material.

During the production of beads which are precursors for expandable beads, some batches comprise beads which do not meet specifications. Although such off-specification beads have utility as scrap for molding operations, there has not been any appropriate market for such beads which utilizes their spherical shape. There has been a long standing demand for methods for converting cloudy beads into crystal clear polystyrene beads, and for converting precursor beads into polystyrene reflector beads.

SUMMARY OF THE INVENTION

In accordance with the present invention, precursor beads (usually comprising at least a portion of cloudy beads) of polystyrene are dispersed in an aqueous system containing an inorganic solute in a concentration of at a least about 1.5 molar but not more than about 6 molar and such dispersion is heated to a temperature in the range from about 110° C. to about 130° C. for a few minutes and then cooled. The thus-treated beads are washed and dried and provide reflector beads useful for many decorative purposes by reason of the combination of their transparency and spherical shape.

DETAILED DESCRIPTION

The invention is further clarified by reference to a plurality of examples.

Control Example A

A batch of polystyrene beads having an average diameter of 1/32 of an inch was prepared following the general procedure shown for Example IV of Grim U.S. Pat. No. 2,673,194. A solution of 0.008 part of sodium oleate was dissolved in 40 parts of distilled water to which was added 0.5 parts of hydroxy apatite having a particle size of reasonably uniform nature and of the order of 0.03 to 0.06 micron. The combination of the organic dispersing agent, that is, sodium oleate, and the inorganic sub-micron particle, that is, the hydroxy apatite, is important in the suspension polymerization for achieving the beads of reasonably uniform size. The aqueous suspension of hydroxy apatite was modified by the addition of 60 parts of styrene containing 0.105 parts of benzylperoxide, corresponding to 0.175% of the benzylperoxide catalyst in the styrene.

This mixture was agitated in a flask provided with an axial impeller-type agitator and suspended swirl baffles to form a a suspension. The suspension thus formed was heated at 90° C. with continued agitation in a nitrogen atmosphere for 20 hours. The styrene polymerized to provide a suspension of polystyrene beads. The reaction mixture was allowed to cool. The pH of the dispersion medium, which was 5.6 at the finish of the polymerization, was changed to pH 2 by the addition of concentrated hydrochloric acid. The thus cooled and acidified suspension of polystyrene beads in water was centrifuged to separate the polystyrene beads, which were washed with water at ambient temperature and dried. The beads, which had an average diameter of about 1/32 inch, had a molecular weight of about 228,000. Appropriate tests were conducted by molding the beads.

At the elevated temperature, the polymer tends to trap tiny micelles of water in some of the beads. Such water is volatilized from the bead during the drying step, thus providing tiny air cells near the bead surface. Such air cells are believed to impart cloudiness to the appearance of such beads.

Partly because of the method of manufacture, some of the beads have a cloudy appearance which limits their utility but does not impair their effectiveness for production of expandable beads and/or for the molding of articles using such beads in lieu of convention molding pellets. However, the cloudiness does impair the usefulness of the uniformly sized beads for many of the purposes for which clear transparent beads are used. Thus, in making of signs or in the making of reflecting screens for movie screens or the like, the beads should be crystal clear and water white.

EXAMPLE 1

An aqueous solution containing 2 molar (about 20% weight) calcium chloride is prepared and the precursor beads prepared in accordance with Example A are dispersed in the calcium chloride brine. The thus prepared dispersion is agitated and heated to a temperature of about 125° C. and maintained at the elevated temperature for about 10 minutes. The solution is then allowed to cool and the beads are separated from the brine. The thus separated beads are rinsed to remove the traces of brine and then dried. The resulting beads are crystal clear and water white and suitable for use as reflector beads for decorative purposes.

When an aqueous dispersion of polystyrene beads is heated above the glass-transition temperatures (about 105° C.) the polystyrene tends to develop a solution of water in such heat-modified polystyrene. However, if instead of water, the suspending medium is a brine having a molar concentration within a range from about 1.5 to about 6 molar therein, the salt solution by an osmotic effect prevents the absorption of water into the bead. Any air cells promoting cloudiness are thermally reshaped into clear transparent beads by the hot brine. Any water in precursor beads is readily diverted into the hot solution of inorganic solute. Because the brine-treated beads lack the cloudiness of the precursor beads, they are useful as reflector beads.

EXAMPLE 2

A series of batches of beads are manufactured as precursors for expandable beads. Prior to the step of impregnation of the blowing agent, the beads are subjected to a size separation, so that only the beads of the desired size are advanced toward the zone for the impregnation of the blowing agent.

The undersized beads are separated and are found to contain a significant number of cloudy beads. The undersized beads are dispersed in a 6 molar solution (about 20% by weight) of hydrochloric acid and heated at 130° C. for 4 minutes, followed by cooling and a drainage of the acid solution from the process beads and the washing and the drying of the beads. The beads are crystal clear and water white and suitable for use for decorative purposes.

CONTROL B

A batch of undersized beads comprising some cloudy beads of the type used in Example 2 are dispersed in water and heated at a temperature of about 125° for 2 minutes as in Example 1. The thus processed beads are cooled, water washed and dried. It is found that the number of cloudy beads is significantly great, believed to be attributable to the occlusion of water during the hot liquid treatment, and the removal of such water during drying, thereby providing air cells in the bead and/or at the surface thereof. It is believed that a solubility phenomenon causes the cloudiness when using distilled water. Such cloudiness is avoided when solution of an inorganic component of 1.5 to 6 molarity is employed for the controlled de-clouding step.

EXAMPLE 3

By a series of tests it is established that the concentration of the ionized inorganic solute in the aqueous system must be at least about 1.5 molar and not more than about 6 molar, that the de-clouding treatment must be conducted at a temperature within a range from about 110° C. to about 130° C. from about 2 to about 20 minutes, followed by water rinsing and drying to produce crystal clear reflector beads.

EXAMPLE 4

Precursor beads are converted to reflector beads by treatment at about 125° C. using about a 4 molar solution for about 20 minutes. Sodium chloride, potassium iodide, sodium nitrate, magnesium chloride, sodium hydroxide, calcium chloride, and appropriate mixtures thereof, are shown to be effective inorganic solutes for the invention. After the brine treatment, the beads are drained, washed, and dried. On the basis of the good results obtained with such a variety of solutes, it was concluded that similar water soluble inorganic solutes could be effective.

Various modifications of the invention are possible without departing from the scope of the appended claims.

The invention claimed is:

1. The method for production of reflector beads from precursor polystyrene beads which includes the steps: of preparing an aqueous solution having an inorganic solute having a concentration within the range from about 1.5 about 6 molar; preparing a dispersion of precursor polystyrene beads in said solution: maintaining said dispersion at a temperature within the range from about 110° to about 130° C. for a period from about 2 to about 20 minutes; thereafter water rinsing and drying the beads to provide crystal clear reflector beads.

2. The method of claim 1 in which the inorganic solute is selected from the group consisting of sodium chloride, potassium iodide, calcium chloride, sodium nitrate, hydrochloric acid, magnesium chloride, sodium hydroxide, and mixtures thereof.

3. The method of claim 1 in which said dispersion is maintained at about 125° C. for about 10 minutes.

* * * * *